(12) United States Patent
Iinuma et al.

(10) Patent No.: US 7,545,456 B2
(45) Date of Patent: Jun. 9, 2009

(54) OPTICAL DEVICE AND PROJECTOR

(75) Inventors: Kazuyuki Iinuma, Hotaka-machi (JP); Takashi Saegusa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 500 days.

(21) Appl. No.: 11/060,795

(22) Filed: Feb. 18, 2005

(65) Prior Publication Data
US 2005/0179876 A1 Aug. 18, 2005

(30) Foreign Application Priority Data
Feb. 18, 2004 (JP) .............................. 2004-041826

(51) Int. Cl.
*G02F 1/1333* (2006.01)
(52) U.S. Cl. ...................................................... 349/58
(58) Field of Classification Search .................. 349/58, 349/5–9; 361/681; 353/119
See application file for complete search history.

(56) References Cited

U.S. PATENT DOCUMENTS

| | | | |
|---|---|---|---|
| 6,406,151 B1* | 6/2002 | Fujimori ...................... 353/119 |
| 6,854,848 B2 | 2/2005 | Fujimori et al. | |
| 6,935,745 B1 | 8/2005 | Kitabayashi et al. | |
| 7,114,816 B2* | 10/2006 | Fujimori et al. ............ 353/119 |
| 7,118,230 B2* | 10/2006 | Fujimori et al. ............ 353/119 |
| 7,148,945 B2* | 12/2006 | Yanagisawa ................ 349/161 |
| 2005/0195460 A1* | 9/2005 | Fujimori et al. ............ 359/237 |

FOREIGN PATENT DOCUMENTS

| | | |
|---|---|---|
| JP | A 08-304739 | 11/1996 |
| JP | A 10-010994 | 1/1998 |
| JP | A-2001-21989 | 1/2001 |
| JP | A-2002-229121 | 8/2002 |
| JP | A-2002-318340 | 10/2002 |
| JP | A-2003-43442 | 2/2003 |
| JP | A-2003-121931 | 4/2003 |

* cited by examiner

*Primary Examiner*—James A Dudek
(74) *Attorney, Agent, or Firm*—Oliff & Berridge, PLC

(57) ABSTRACT

To provide an optical device by which the ease of assembly, and image quality and cooling performance an optical device includes light modulators and a light combining device to combine optical images includes fixing members opposing located to the luminous flux incident end surfaces of the light combining device and fixed to the light combining device and holding members provided to the fixing members to hold the light modulators. The fixing members and the holding members are formed to have C-shaped sections having base portions formed of rectangular plates in which opening portions to transmit luminous fluxes and pairs of standing pieces standing from the outer peripheral edges of the base portions and are opposed to each other. The pairs of standing pieces of the fixing members and the pairs of standing pieces of the holding members are slidingly fit together.

7 Claims, 4 Drawing Sheets

OPTICAL DEVICE AND PROJECTOR

BACKGROUND

Exemplary aspects of the present invention relate to an optical device including plural light modulators to modulate plural color lights with respect to each color light according to image information and to form optical images and to a light combining device having plural luminous flux incident end surfaces opposed to the respective light modulators to combine the optical images formed in the respective light modulators, and a projector including the optical device.

Related art projectors are utilized for presentation application in conferences, academic conferences, and exhibitions or the like, and for home theater application.

A related art 3-LCD projector includes a color separation system to separate luminous fluxes output from a light source lamp into color lights of three colors of red, green, and blue using a dichroic mirror, three liquid crystal panels (light modulating devices for light modulation in light modulators) to modulate the separated luminous fluxes according to image information with respect to each color light, an optical device having a cross dichroic prism (light combining device) to combine the luminous fluxes modulated in the respective liquid crystal panels, and a projection lens to enlarge and project a color optical image formed by the optical device on a screen.

In an optical device incorporated into such a projector, the ease of assembly is created by integrally assembling optical conversion elements, such as liquid crystal panels and polarizing plates in the cross dichroic prism.

For example, the three liquid crystal panels are accommodated in recessed portions of holding frames and pressingly fixed with fixing plates, respectively. To the luminous flux incident end surfaces toward the three directions on the sides of the cross dichroic prism, fixing frame plates to finally fix the liquid crystal panels are attached, and intermediate frame plates for temporal fixation are secured to the fixing plates by screws. See Publication of Japanese Patent Application No. Hei-10-10994 (FIG. 7).

In this example, the liquid crystal panel is temporarily fixed by inserting pins protruded from four corners of the intermediate frame plates into and engaged with holes of the holding frames. Pairs of wedges are pressed into space between the liquid crystal panels and the holding frames in this condition. Finally, these wedges are fixed to the fixing members by adhesive bonding.

In the case where the optical device is incorporated into the projector, it is necessary to locate the respective liquid crystal panels in positions of the back focus of the projection lens. Further, since every single pixel of the projection image is formed by additive color mixing of three primary colors of red, green, and blue, it is necessary to obtain finer images to prevent pixel displacement by adjusting the relative positions of the respective liquid crystal panels with high accuracy.

Therefore, in the related art, positioning is performed by making adjustments in the z direction along an optical axis according to the insertion amounts of the respective pins and respective wedges, while moving the fixing plates adhered to the luminous flux end surfaces of the cross dichroic prism in the X direction, Y direction, and rotation directions thereof. See Publication of Japanese Patent Application No. Hei-10-10994 (FIG. 7).

Higher brightness of such a projector is being promoted, and accordingly, cooling of the optical devices, such as liquid crystal panels becomes an important challenge. Here, as a forced cooling method, air taken from the outside has been blown on these optical devices by a fan. See Publication of Japanese Patent Application No. Hei-10-10994 (FIG. 7).

SUMMARY

However, in the related art mounting structure of the liquid crystal panels, since a large number of parts, such as fixing frames, intermediate frames from which pins are protruded, fixing plates, holding frames, and wedges are required, and further, relatively complex parts are included, there has been a problem that a large effort to assemble the wide variety of parts is required and the process becomes complex. Thereby, the cost of manufacturing, including equipment investment, becomes increased.

Further, due to the complex mounting structure, since members to be moved are different according to the directions of adjustment, and further, plural pins and wedges or the like are moved at the time of positioning operation of liquid crystal panels, manufacturing equipment and process become complicated and workability is poor.

In addition, although plural pins and wedges are used as fixing members, errors in shapes easily occur for these small members, and there is a possibility that positioning operation of the liquid crystal panels becomes difficult. Further, after positioning, the liquid crystal panels are just partially bonded or supported by the pins and wedges. In the case where an impact is applied thereon or the device is used for many years, the relative positions of the respective liquid crystal panels are easily displaced and pixel displacement of the optical images possibly occurs.

In the case where forced cooling is performed by introducing external air, there is a possibility that the sound of motor of the cooling fan becomes undesirable noise, especially in the home theater application, and cooling efficiency has a limitation as the internal thermal density rises with smaller size and higher brightness.

Exemplary aspects of the invention is, in light of above described and/or other problems, provide an optical device capable of enhancing workability in assembly, contributing to enhancement in image quality, and further enhancing cooling performance, and a projector equipped with the optical device.

An optical device of an exemplary aspect of the invention is an optical device including plural light modulators to form optical images by modulating plural color lights with respect to each color light according to image information and a light combining device having plural luminous flux incident end surfaces opposite to the respective light modulators to combine the optical images formed in the respective light modulators. The optical device includes fixing members opposing located on the luminous flux incident end surfaces of the light combining device and fixed to the light combining device and holding members provided to the fixing members to hold the light modulators. The fixing members are formed to have C-shaped sections having base portions opposed to the luminous flux incident end surfaces and formed of rectangular plates in which opening portions to transmit luminous fluxes are formed and pairs of standing pieces standing from the outer, peripheral edges of the base portions and opposed to each other. The holding members are formed to have C-shaped sections having base portions formed of rectangular plates in which opening portions to transmit luminous fluxes are formed and to which the light modulators are mounted and pairs of standing pieces standing from the outer peripheral edges of the base portions toward the luminous flux incident end surfaces and opposed to each other. The pairs of standing pieces of the fixing members and the pairs of standing pieces of the holding members are slidingly fit together.

Here, as the light combining device, a cross dichroic prism or the like can be adopted. The cross dichroic prism is a hexahedron having an appearance nearly in a cubic form in which four right angle prisms are combined. The color lights respectively output from the three light modulators opposing disposed on the luminous flux incident end surfaces toward the three directions on the side three surfaces are combined by X-shaped dielectric multilayer films provided at the interfaces of the respective right angle prisms.

Further, when the optical device is incorporated into a casing of electronic equipment or the like, bases can be used as fixing attachments to the casing. The fixing members may be directly fixed to the light combining device, or indirectly fixed to the light combining device via the bases.

The fixing members and the holding members are fit in a nested manner, and, at this time, which is outer or which is inner is not considered.

According to an exemplary aspect of the invention, when the fixing members and the holding members are fit and fixed together, the light modulators are mounted to the light combining device and fixed thereto. Thereby, essential members to mount the light modulators to the light combining device are just two of the fixing members and the holding members and the number of parts can be reduced.

Therefore, in the related art, pins, wedges, or a variety of fixing plates have been required and a structure in which these are mounted in multiple layers has been adopted. However, the manufacturing process can be simplified, and thereby, the ease of assembly can be enhanced dramatically. Additionally, the cost of manufacturing including equipment investment can be reduced.

Here, the fixing members and the holding members can be formed by cutting general-purpose metal pipes open into C shapes using a plate press machine easily at low price. Since it is not required to protrudingly form pins or wedges on the fixing members and the holding members, there is no longer a part having complex shapes, and the part cost can be suppressed and the shape accuracy of the members can be enhanced.

Further, the position of the light modulators are adjusted by slidingly moving the fixing members and the holding members at the standing pieces thereof. Since these fixing members and holding members are fit together with gaps, and the light modulators can be adjusted in any direction of the direction in which pairs of standing pieces are opposed (set to the X direction), the Y direction in which the standing pieces extend along the outer periphery of the base portions, the Z direction (optical axis direction) in which the standing pieces stands, and the respective rotation directions of the X and Y directions.

Here, since the essential members relating to the mounting of the light modulators are just fixing members and the holding members, as long as the light combining device is located on the predetermined optical axis, the light modulators are positioned only by position adjustment between the fixing members and the holding members.

Thereby, in the related art, the pins protruded from four corners of the fixing plates are moved for adjustment in the optical axis direction and pairs of wedges inserted between the fixing plates are moved or the fixing plates are moved along the luminous flux incident end surfaces of the light combining device for adjustment in other directions. However, a positioning operation can be made considerably easier.

Furthermore, the correlated positions of the related art pins, wedges, and variety of fixing members have influences on positioning of the light modulators. However, because of the simple forms of fixing members and holding members there is hardly any factor that makes the light modulators out of position. The simply formed fixing members and holding members are easily formed with accuracy, and there is no difficulty in the positioning operation.

Therefore, in the case where the optical device is incorporated into a projector, the light modulators to be positioned at the back focus of the projection lens can be positioned with high accuracy. Thereby, finer projection images can be realized.

In the related art, the light modulators are only partially mounted by projecting ends of pins or the like. However, the modulators are fixed by the fixing members and the holding members larger than the pins or the like. Thereby, even when an impact is applied, or the modulators are used for many years, the positions of the light modulators are hardly displaced and pixel displacement of optical images can be reduced or prevented.

Furthermore, regarding the shapes of the fixing members and the holding members, since the standing pieces stand nearly along the predetermined optical axis between the light combining device and the light modulators, luminous fluxes are blocked as little as possible by the standing pieces of the fixing members and the holding members from when the luminous fluxes-output from the light modulators are transmitted through the opening positions of the holding members and the fixing members until they enter the luminous flux incident end surfaces of the light combining device. Thereby, in the related art, margins depending on the pins and wedges are needed on the luminous flux incident end surfaces of the light combining device because the luminous fluxes are blocked according to the degree of overlapping of the pins and wedges and the luminous flux incident end surfaces. However, the margins can be minimized.

Therefore, the light combining device can be downsized relative to the size of the image forming regions of the light modulators, and the part cost of the light combining device can be reduced and the entire optical device can be downsized.

In the related art, since various fixing plates are assembled with pins and wedges in multiple layers and the assembly structure takes much space in the surface outward directions of the luminous flux incident end surfaces of the light combining device, the optical device can not be downsized sufficiently. However, since the standing pieces of the fixing members and the holding members are overlapped and secured, they do not take so much space in the surface outward directions of the luminous flux incident end surfaces. Thereby, that also enables downsizing.

The temperatures of the light modulators rise by being applied with light. However, the heat of the light modulators is conducted promptly to the fixing members and the holding members, and rapidly released to the outside of the optical device via the fixing members and the holding members.

Here, since the fixing members and the holding members have surface areas enlarged by the pairs of standing pieces and large heat capacities, malfunction and deterioration of the light modulators can be reduced or prevented.

In an optical device of an exemplary aspect of the invention, holes may be formed in one of the fixing members and the holding members and protrusions inserted into the holes are formed in the other.

According to an exemplary aspect of the invention, at the time of the positioning operation of the light modulators, by inserting the protrusions into holes, the protrusions are supported at the hole parts and the fixing members and the holding members are not separated or dropped. Thereby, positioning operation can be performed more easily.

At this time, the positioning operation is performed in a range in which the protrusions can be moved within the holes, and the positions, shapes, and sizes of the holes and protrusions can be set appropriately. For example, when the holes are formed in the standing pieces and made into slots having longer diameter along the optical direction, the light modulators can be moved largely along the optical axis, and the adjustment margin of focus adjustment can be secured largely. Sometimes the diameters of the holes may be set smaller and the movements of the protrusions are regulated.

In an optical device of an exemplary aspect of the invention, optical conversion elements located between the light modulators and the luminous flux incident end surfaces may be provided, and the optical conversion elements are mounted to the standing piece tip end portions of the holding members.

According to an exemplary aspect of the invention, there is space depending on the standing pieces of the fixing members and the holding members between the light modulators and the light combining device, and optical conversion elements, such as polarizing plates, viewing angle correcting plates, retardation plates, and various optical filters are located here and the optical conversion elements are accommodated and held by the fixing members and the holding members.

Thereby, since the optical conversion elements are also held in the mounting structure of the light modulators, a structure to support only the optical conversion elements is no longer required, and enhancement in ease of assembly and downsizing of the optical device can be achieved.

Furthermore, the heat generated by the optical conversion elements is immediately conducted to the fixing members and the holding members, and released quickly to the outside of the optical device via the fixing members and the holding members.

Here, the optical conversion elements are surroundingly held by the standing pieces. Thereby, the fixing members and the holding members serve as effective heat sinks to absorb the heat of the optical conversion elements.

Therefore, the optical conversion elements in which the temperature has risen by the application of light is efficiently heat released and cooled, and heat deterioration of the optical conversion elements can be reduced or prevented. Especially, the light exit-side polarizers (optical conversion elements) to absorb luminous fluxes output from the light modulators and outputting certain polarized light are easily overheated by the absorption fever of light, and the effect by the heat release cooling stands out.

A projector according to an exemplary aspect of the invention is a projector to form an optical image by modulating luminous fluxes output from a light source according to image information and enlarging and projecting the image. The projector is characterized by including the above described optical device.

According to an exemplary aspect of the invention, since the optical device has the above described operation and effects, the same operation and effect can be enjoyed.

In the projector of an exemplary aspect of the invention, a cooling device to circulate air taken from the outside may be adopted, and the fixing members and the holding members are oriented so that the C-shaped sections may be substantially perpendicular to the flow of the air.

According to an exemplary aspect of the invention, since the C-shaped sections of the fixing members and the holding members face against the flow of the air circulating within the projector, the loss in the amount of the blasted air is suppressed as little as possible. Since the outer peripheral surfaces of the fixing members and the holding members follow the flow of the air, rectification can be obtained. Thereby, the air can hardly escape to the outside of the fixing members and the holding members cool the optical conversion elements surrounded by the pairs of standing pieces sufficiently, and thereby, contribute to the cooling efficiency of the projector by reducing or preventing the temperature rise of the optical device.

DETAILED DESCRIPTION OF EXEMPLARY EMBODIMENTS

Hereinafter, a projector according to an exemplary embodiment of the invention will be described using the drawings.

1-1. Main Construction of Projector

Figure 1:
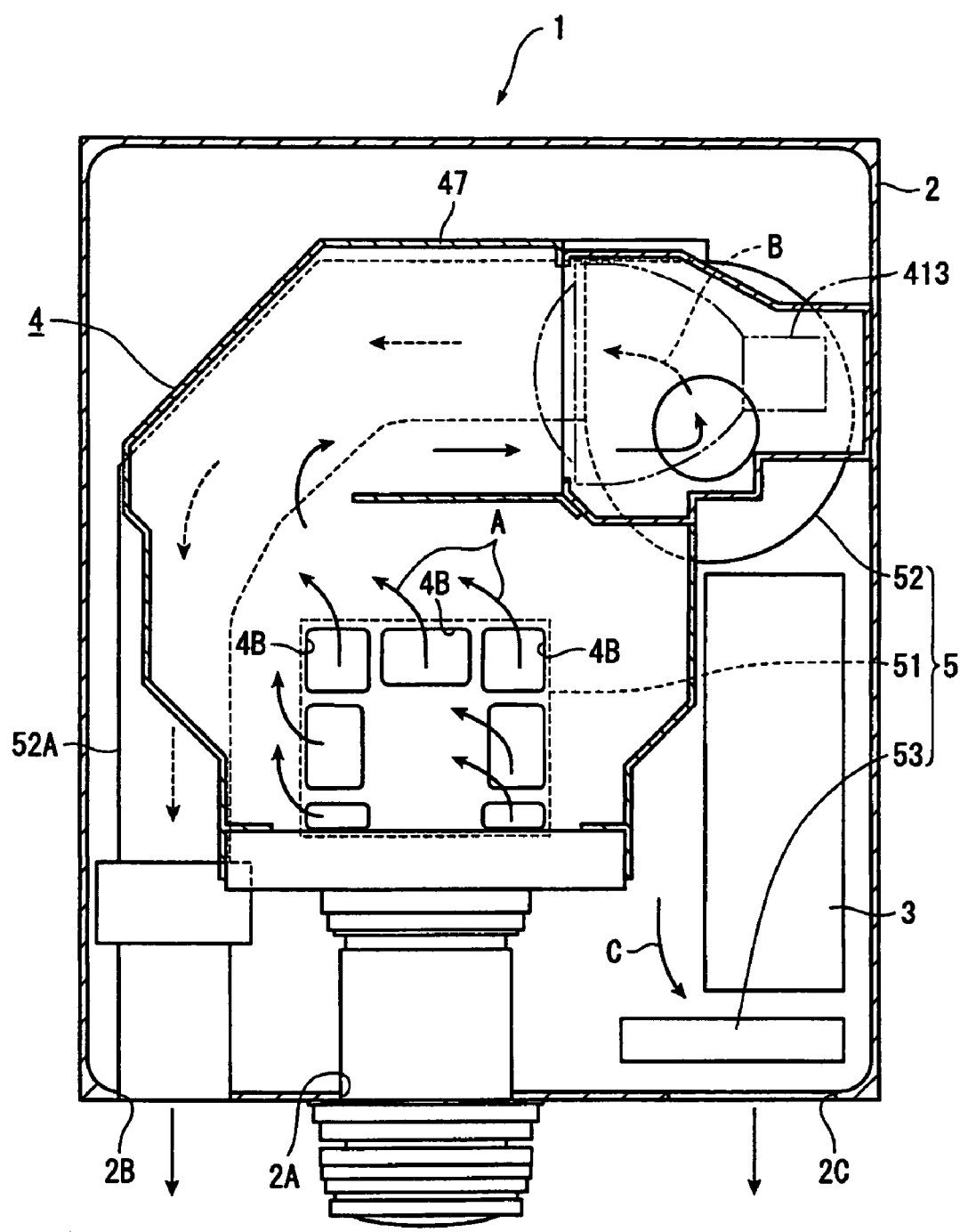
FIG. 1 is a schematic showing the construction of the projector according to an exemplary embodiment of the invention.

FIG. 1 is a schematic showing the structure of a projector 1. The projector 1 includes an exterior case 2 made of a resin substantially in a rectangular parallelepiped form as a whole, an optical unit 4 to optically process luminous fluxes output from a light source 413 and forming optical images according to image information, a cooling unit 5 as a cooling device to release heat generated within the projector 1 to the outside, and a power supply unit 3 to supply power supplied from the outside to these units 4, 5, etc.

The exterior case 2 accommodates the respective units 3 to 5, and, though specific illustration thereof is omitted, includes an upper case that forms the upper surface part, front surface part, and side surface part of the projector and a lower case that forms the bottom surface part, side surface part, and rear surface part of the projector 1.

As shown in FIG. 1, in the front surface of the exterior case 2, a notch portion 2A is formed. Part of the optical unit 4 accommodated in the exterior case 2 is exposed to the outside from the notch portion 2A. Further, in the front surface of the exterior case 2, on both sides of the notch portion 2A, exhaust openings 2B and 2C to exhaust air within the projector 1 are formed. In the bottom surface of the exterior case 2, at the part corresponding to an optical device 44, which will be described later, that forms the optical unit 4, an air intake opening (not shown) to take in cooling air from the outside is formed.

The power supply unit 3 is disposed on the right side of the optical unit 4 within the exterior case 2 in the drawing as shown in FIG. 1. The power supply unit 3 is, though specific illustration thereof is omitted, to supply power supplied via a power supply cable inserted into an inlet connector to a lamp drive circuit (ballast), a driver board (omitted to be shown), or the like.

The lamp drive circuit supplies the supplied power to a light source lamp 411 of the optical unit 4. The driver board, though illustration thereof is omitted, is disposed above the optical unit 4 to perform arithmetic processing of the input image information, and then, control of liquid crystal panels 441R, 441G, and 441B, which will be described later, or the like.

The power supply unit 3 and the optical unit 4 are covered by a shielding plate made of a metal, such as aluminum or magnesium. Further, the lamp drive circuit and the driver board are also covered by a shielding plate made of a metal, such as aluminum or magnesium. Thereby, leakage of electromagnetic noise from the power supply unit 3, driver board, or the like to the outside is reduced or prevented.

The cooling unit 5 cools the inside of the projector 1 by taking cooling air into a channel within the projector 1, allowing the cooling air to absorb the heat generated within the projector 1, and exhausting the warmed cooling air to the outside. The cooling unit 5 includes an axial-flow air intake fan 51, a sirocco fan 52, and an axial-flow air exhaust fan 53.

The axial-flow air intake fan 51 is disposed below the optical device 44 of the optical unit 4 and above the air intake opening of the exterior case 2. The axial-flow air intake fan 51 cools the optical device 44 by taking cooling air into the optical unit 4 from the outside via the air intake opening.

The sirocco fan 52 is disposed below the light source 413 of the optical unit 4. The sirocco fan 52 draws the cooling air taken by the axial-flow air intake fan 51 within the optical unit 4 and draws heat from the light source 413 in the process of drawing air, and exhausts the warmed cooling air to the outside through a duct 52A located below the optical unit 4 from the exhaust opening 2B.

The axial-flow air exhaust fan 53 is located between the exhaust opening 2C formed in the front surface of the exterior case 2 and the power supply unit 3. The axial-flow air exhaust fan 53 takes air near the power supply unit 3, which has been warmed by the power supply unit 3, and exhausts the air from the exhaust opening 2C.

1-2. Construction of Optical Unit

Figure 2:
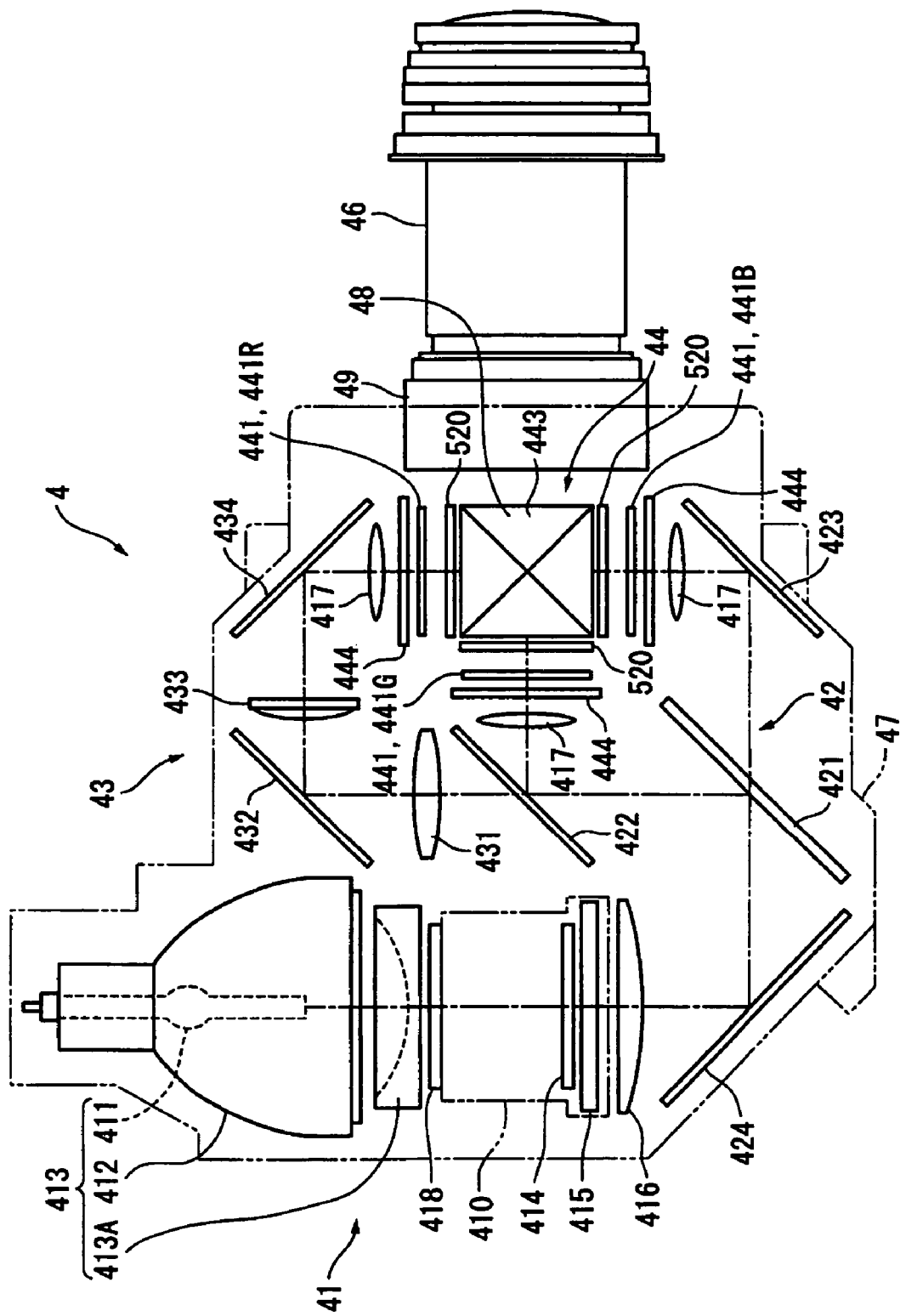
FIG. 2 is a schematic showing the optical unit in an exemplary embodiment.

FIG. 2 is a schematic showing the optical unit 4.

As shown in FIG. 2, the optical unit 4 is a unit formed substantially in an L shape in plan view to optically process the luminous fluxes output from the light source lamp 411 and form optical images according to image information. The optical unit 4 includes an integrator illumination system 41, a color separation system 42, a relay system 43, the optical device 44, and a projection lens 46. These optical components 41 to 44 and 46 are accommodated within an optical component casing 47 and fixed.

The integrator illumination system 41 is an optical system for nearly uniformly illuminating image formation areas of three liquid crystal panels 441 (respectively referred to as liquid crystal panels 441R, 441G, and 441B with respect to each color light of red, green, and blue), and includes the light source 413, a first lens array 418, a second lens array 414, a polarization conversion element 415, and a superimposing lens 416 as shown in FIG. 2.

The light source 413 includes the light source lamp 411 to output radial beams, an ellipsoidal mirror 412 to reflect radiation light output from the light source lamp 411, and a parallelizing convex lens 413A to parallelize the light output from the light source lamp 411 and reflected by the ellipsoidal mirror 412. A UV filter (not shown) is provided on the flat part of the parallelizing convex lens 413A. Further, as the light source lamp 411, a halogen lamp, a metal halide lamp, a high-pressure mercury lamp, an ultra high-pressure mercury lamp, or the like can be used. Furthermore, a parabolic mirror may be used in place of the ellipsoidal mirror 412 and parallelizing convex lens 413A.

The first lens array 418 includes small lenses having substantially rectangular outlines seen from the optical axis direction arranged in a matrix form. Each small lens divides a luminous flux output from the light source lamp 411 into plural partial luminous fluxes.

The second lens array 414 has substantially the same construction as the first lens array 418, and includes small lenses arranged in a matrix form. The second lens array 414 has a function of forming images of the respective small lenses of the first lens array 418 on the liquid crystal panels 441 with the superimposing lens 416.

The polarization conversion element 415 is located between the second lens array 414 and the superimposing lens 416, and unitized integrally with the second lens array 414. The polarization conversion element 415 converts the light from the second lens array 414 into a single type of polarized light, and thereby, utilization efficiency of light in the optical device 44 is made higher. Further, as shown by chain double-dashed lines in FIG. 2, the unitized polarization conversion element 415 and second lens array 414 and the first lens array 418 are integrally unitized.

Specifically, the respective partial lights that have been converted into a single type of polarized lights by the polarization conversion element 415 are finally superimposed nearly on the liquid crystal panels 441R, 441G, and 441B of the optical device 44 by the superimposing lens 416. In the projector 1 (optical device 44) using the liquid crystal panel 441 of the type to modulate polarized light, since only one kind of polarized light can be utilized, nearly a half of the lights from the light source lamp 411 that emits random polarized lights are not utilized. Accordingly, the exit lights from the light source lamp 411 are converted into a single type of polarized lights using the polarization conversion element 415. Utilization efficiency of light in the optical device 44 is made higher. Such a polarization conversion element 415 is disclosed in Publication of Japanese Application No. Hei-8-304739, for example.

The color separation system 42 includes two dichroic mirrors 421 and 422 and reflection mirrors 423 and 424, and has a function of separating the plural partial luminous fluxes output from the integrator illumination system 41 into color lights of three colors of red, green, and blue.

The relay system 43 includes a light incident-side lens 431, a relay lens 433, and reflection mirrors 432 and 434, and has a function of guiding the color light (red light) separated in the color separation system 42 to the liquid crystal panel 441R.

In such optical systems 41, 42, and 43, the blue light component of the luminous fluxes output from the integrator illumination system 41 is transmitted through the dichroic mirror 421 of the color separation system 42 and the red light component and the green light component are reflected by the mirror. The blue light component transmitted though the dichroic mirror 421 is reflected by the reflection mirror 423, passes through a field lens 417, and reaches the liquid crystal panel 441B for blue. The field lens 417 converts the respective partial luminous fluxes output from the second lens array 414 into luminous fluxes parallel with the central axis thereof (principal beam). The field lenses 417 provided at the light incident sides of the other liquid crystal panels 441R and 441G are similar.

Of the red light and green light reflected by the dichroic mirror 421, the green light is reflected by the dichroic mirror 422, passes through the field lens 417, and reaches the liquid crystal panel 441G for green. The red light is transmitted through the dichroic mirror 422, passes through the relay system 43, further passes through the field lens 417, and reaches the liquid crystal panel 441R for red. The relay system 43 is used for red light in order to reduce or prevent the deterioration in the utilization efficiency of light due to diffusion of light or the like because the length of an optical path of red light is longer than the lengths of optical paths of the other color lights. Specifically, in order to pass the partial luminous flux that has entered the light incident-side lens 431 to the field lens 417 without change. The relay system 43 is arranged so as to pass the red light of three color lights. However, the system may be arranged so as to pass the other light, such as the blue light.

The optical device 44 forms color images by modulating the incident luminous fluxes according to the image information, and includes: light incident-side polarizers 444 as so-called polarizers into which the luminous fluxes output from the color separation system 42 are entered; three light modulators 440R, 440G, and 440B located in the subsequent stages of the respective light incident-side polarizers 444 along the optical paths; light exit-side polarizers 630 as so-called analyzers located in the subsequent stages of the respective light modulators 440R, 440G, and 440B along the optical paths, and a cross dichroic prism 443 as a light combining device. The optical components 441, 443, and 630 are integrally formed to form an optical device main body 48.

The light incident-side polarizers 444 are optical conversion elements formed separately from the optical device main body 48, and transmit only polarized lights in a certain direction of the respective luminous fluxes separated by the color separation system 42 and absorb the luminous fluxes in other directions.

The light incident-side polarizer 444 includes a polarization film in which a polyvinyl alcohol (PVA) film and a cellulose acetate rectangular film are laminated and a substrate made of sapphire glass onto which the polarization film is attached.

The above described optical components 41 to 44 are accommodated within the optical component casing 47 made of a synthetic resin.

The optical component casing 47 includes, though illustration thereof is omitted, component accommodation members in which grooves for the above described optical components 414 to 418, 421 to 423, 431 to 434, and 444 (FIG. 2) being slidingly fit from above are provided, respectively, and a lid member to close the opening sides of the component accommodation members. Further, in one end of the optical component casing 47 substantially in an L shape in a plan view, the light source 413 is accommodated. In the other end thereof, the projection lens 46 is fixed via a head portion 49.

1-3. Construction of Optical Device Main Body forming Optical Device

Figure 3:
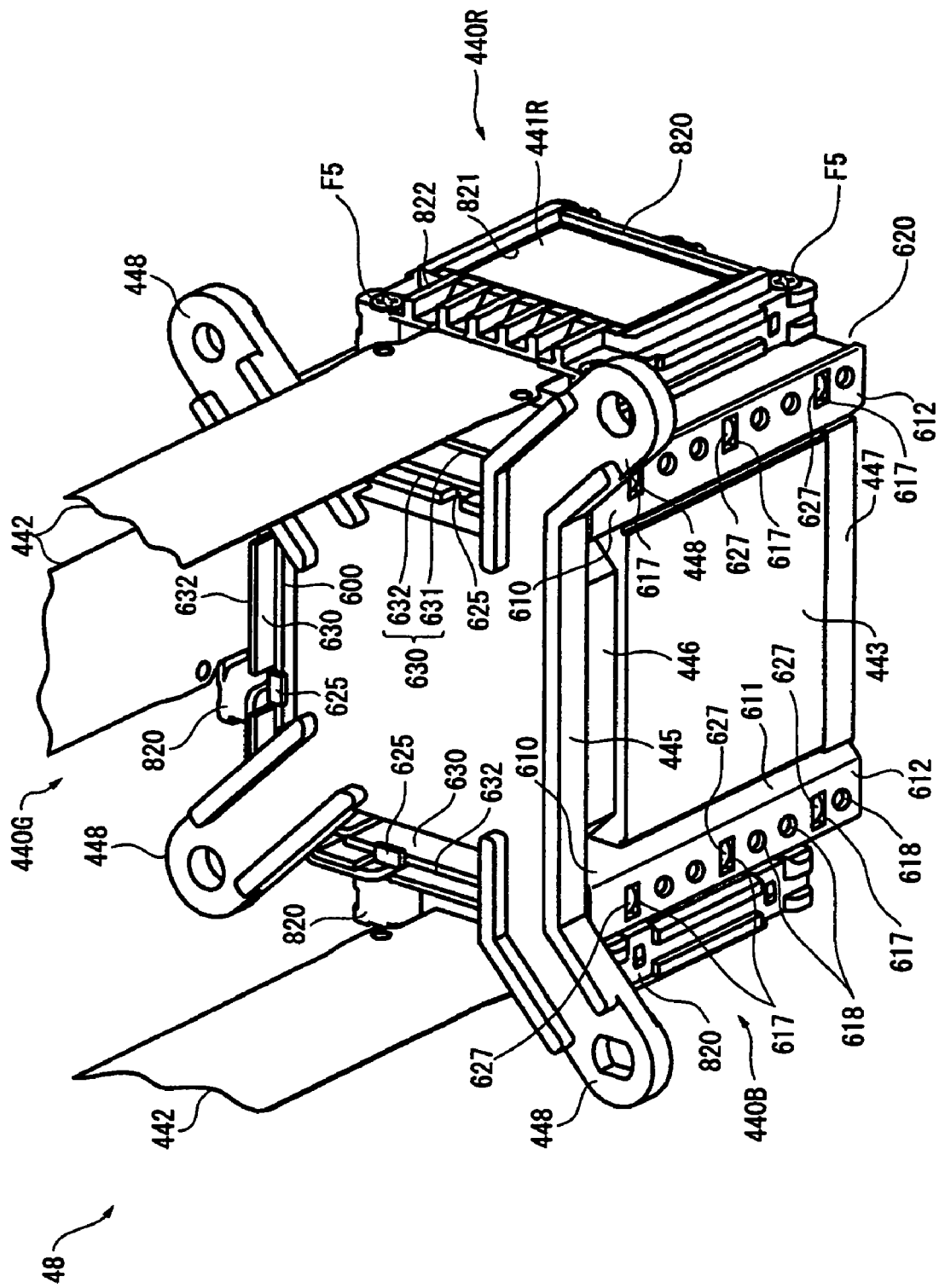
FIG. 3 is a schematic of the optical device in an exemplary embodiment seen from above.

In FIG. 3, the optical device main body 48 is shown.

The optical device main body 48 includes the cross dichroic prism 443, a pair of bases 446 and 447 fixed to upper and lower surfaces as end surfaces substantially perpendicular to the luminous flux incident end surfaces of the cross dichroic prism 443, three fixing members 610 fixed to the bases 446 and 447, three holding members 620 fit with these fixing members 610, and the light modulators 440R, 440G, and 440B fixed to the holding members 620.

The cross dichroic prism 443 forms color images by combining the images output from the light modulators 440R, 440G, and 440B and modulated with respect to each color light, and a hexahedron having an appearance nearly in a cubic form. On the cross dichroic prism 443, a dielectric multilayer film to reflect red light and a dielectric multilayer film to reflect blue light are formed along the interfaces of four right angle prisms nearly in an X shape, and three color lights are combined by these dielectric multilayer films. The color image combined by the cross dichroic prism 443 is output from the projection lens 46 and enlarged and projected on the screen.

The bases 446 and 447 are members to supportingly fix the cross dichroic prism 443 and the fixing members 610 are fixed thereto, and includes an upper base 446 fixed on the upper surface of the cross dichroic prism 443 and a lower base 447 fixed on the lower surface of the cross dichroic prism 443.

The upper base 446 is fixed to the cross dichroic prism 443 with an ultraviolet light cure adhesive after angle adjustment of the cross dichroic prism 443 is finished. The lower base 447 is fixed to the cross dichroic prism 443 with a heat conducting silicone adhesive.

Both the upper base 446 and the lower base 447 are made of an aluminum or magnesium alloy and formed substantially in a square plate form in outside dimensions slightly larger than the upper surface part and lower surface part of the cross dichroic prism 443.

In the upper base 446, arm portions 448 extending toward outside from four corners are formed. By the arm portions 448, the optical device main body 48 is secured to the optical component casing 47 by screws.

The light modulators 440R, 440G, and 440B include the liquid crystal panels 441R, 441G, and 441B and panel holding frames 820 to hold the liquid crystal panels 441R, 441 G, and 441B, respectively, and are formed substantially in rectangular plate shapes as a whole.

The liquid crystal panels 441R, 441G, and 441B include, though specific illustration thereof is omitted, drive substrates and opposite substrates made of glass and TN (twisted nematic) liquid crystal injected between these substrates, and modulate the luminous fluxes incident via the light incident-side polarizers 444 according to image information and output them.

Inside the drive substrate, pixel electrodes of transparent conductors, such as ITO (Indium Tin Oxide), switching devices, such as TFT devices corresponding to the respective pixel electrodes, wiring, an orientation film to orient liquid crystal molecules, etc. are formed. Further, on the inner surface of the opposite substrate, opposite electrodes corresponding to the pixel electrodes, an orientation film having an orientation substantially perpendicular to that of the orientation film of the drive substrate, etc. are formed. Thereby, an active matrix liquid crystal panel is constructed.

Further, a control cable 442 extends out from between these drive substrate and opposite substrate.

The panel holding frames 820 have rectangular opening portions 821 corresponding to image formation areas of the liquid crystal panels 441R, 441G, and 441B and are frame members having rectangular container shapes capable of accommodating the liquid crystal panels 441R, 441G, and 441B, and formed by materials with good heat conductivity, such as magnesium, aluminum, titanium, or alloys containing these metals.

In the four corners of the panel holding frames 820, through holes 830 penetrating the panel holding frame 820 are formed, respectively. Further, on the upper surfaces thereof, heat releasing fins 822 are formed, and, by the heat releasing fins 822, the heat conducted from the liquid crystal panels 441R, 441G, and 441B is easily released through the panel holding frames 820.

Figure 4:
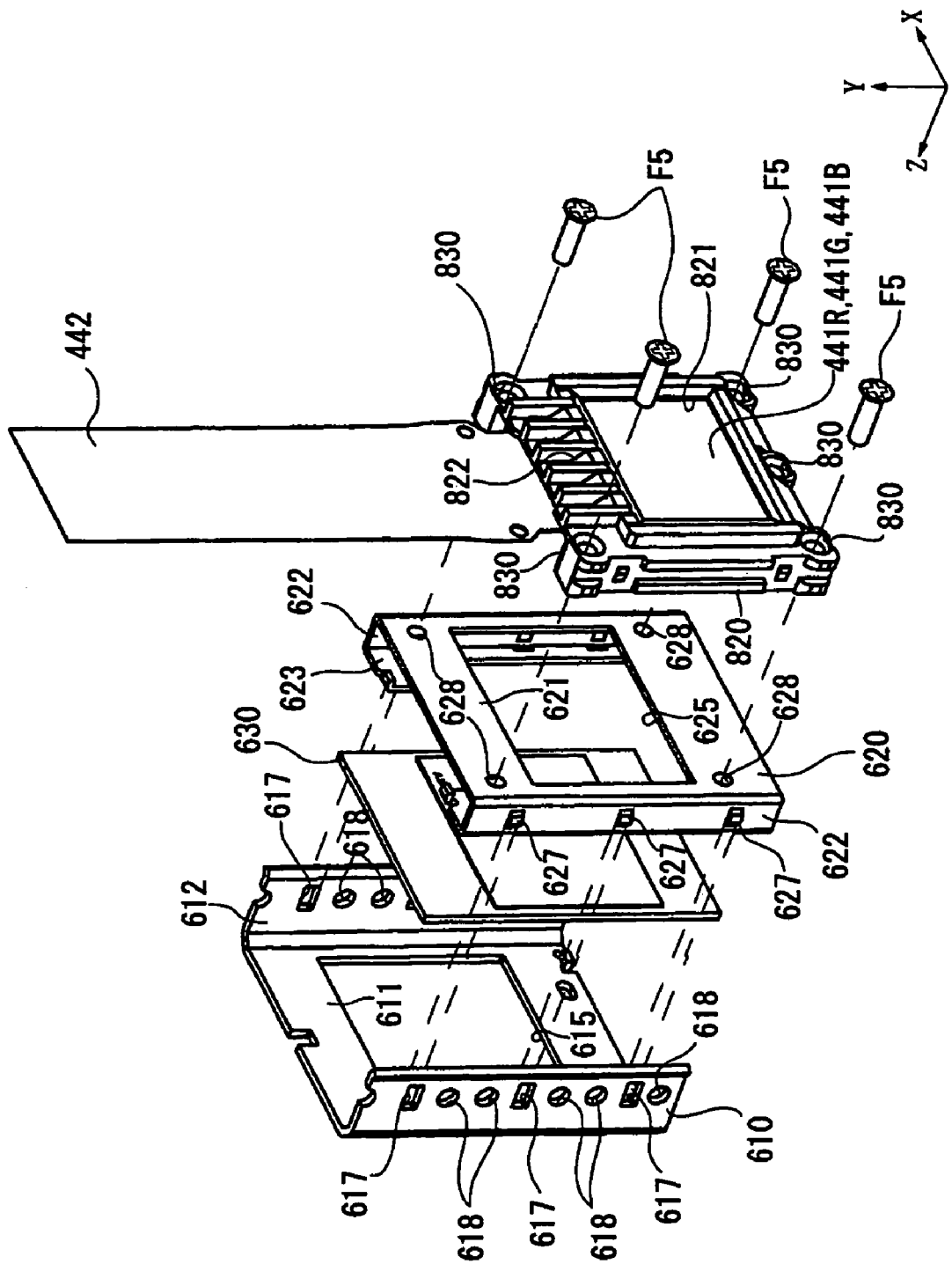
FIG. 4 is a schematic of the fixing member and the holding member in the exemplary embodiment.

As shown in FIG. 4, the fixing member 610 has a channel form with a C-shaped section, and formed so as to include a base portion 611 in a rectangular flat plate form, a pair of standing pieces 612 standing from both left and right ends of the base portion 611 toward the outside of the surface (optical axis direction).

The fixing member 610 is formed with a general-purpose metal pipe made of magnesium, aluminum, titanium, or alloys containing the metals as a material, by cutting the pipe open using a plate press machine easily at low price. Since it has a relatively simple form compared to the related art fixing plate on which pins or the like are formed so as to protrude therefrom or the like, the part cost of the fixing member 610 can be suppressed and the shape accuracy of the members can be enhanced.

In the base portion 611, a rectangular opening portion 615 to transmit luminous fluxes is formed substantially at the center thereof. Both ends of the base portion 611 are fixed to the upper base 446 and the lower base 447 along the luminous flux incident end surfaces of the cross dichroic prism 443.

Further, three slots 617 having longer diameters along the optical axis direction are formed at upper end, middle, and lower end of the standing piece 612. The middle slots 617 are not symmetric between one standing piece 612 and the other standing piece 612, and displaced. Further, plural injection holes 618 for adhesive injection and curing are formed between the slots 617, respectively.

The holding member 620 is formed so as to have a C-shaped section including a base portion 621 in which an opening portion 625 is formed and standing pieces 622 nearly similarly to the fixing member 610, and disposed at the inner side of the fixing member 610 so that the standing piece 612 and the standing piece 622 may overlap via a gap.

Further, the tip end sides of the respective standing pieces are bent in directions close to each other and form bend pieces 623 nearly parallel to the plate surface of the base portion 621.

The base portion 621 has four internal thread holes 628 punched in the positions corresponding to the through holes 830 of the panel holding frame 820. Commercially available screws FS are screwed in the internal thread holes 628 via the through holes 830, respectively, and thereby, the panel holding frame 820 is fixed to the holding member 620. Thus secured by the screws, even when defects are produced in the liquid crystal panels 441R, 441G, and 441B, they can be easily replaced with good ones together with the panel holding frames 820.

Regarding the material of the holding members 620, using a material having a linear expansion coefficient approximated to that of the liquid crystal panels 441R, 441G, and 441B, such as aluminum and iron, for example, produces no deformation caused by thermal expansion because the holding members 620 follow the thermal expansion of the liquid crystal panels 441R, 441 G, and 441B, and pixel displacement of the projected image can be reduced or prevented.

In the standing piece 622, in place of the slots 617 and injection holes 618 in the fixing member 610, protrusions 627 protruding from the surface toward outside are formed in positions corresponding to the slots 617, respectively. The respective protrusions 627 are smaller relative to the slots 617 and, when the holding member 620 and the fixing member 610 are fit together, the protrusions 627 are loosely inserted into the slots 617, respectively.

Here, since the protrusions 627 formed in the middle parts of the standing pieces 622 are not symmetrical between the one standing piece 622 and the other standing piece 622 and displaced as well as the above described slots 617, the fixing member 610 and the holding member 620 are oriented in response to the slots 617 and the protrusions 627 and fit together. Thereby, they can be effectively prevented from being fit together in the reversed orientation.

The light exit-side polarizer 630 is formed substantially similar to the light incident-side polarizer 444, and transmits only polarized light in a predetermined direction of the luminous fluxes output from the liquid crystal panels 441R, 441G, and 441B and absorbs the other luminous fluxes.

Here, tone characteristics of colors of optical images are realized by changing the transmittances of the light exit-side polarizers 630 in response to voltages applied to the liquid crystal panels 441R, 441G, and 441B, and the light exit-side polarizers 630 are deteriorated more easily than the light incident-side polarizers 444 due to absorption fever of light.

Such a light exit-side polarizer 630 is mounted on the front surface sides of the bent pieces 623 with a heat conducting silicone adhesive and held by the holding member 620.

The position where the light exit-side polarizer 630 is held may be on the rear surface side of the bent pieces 623 or may be around (on the front surface side and rear surface side) of the opening portions 615 and 625 of the fixing member 610 and the holding member 620. Thus, since the fixing member 610 and the holding member 620 have high accommodation capacity, it is conceivable that the light exit-side polarizer 630 is formed by plural polarizing plates so as to reliably output certain polarized light.

Furthermore, since the light exit-side polarizer 630 can be replaced with a new one even when a manufacturing defect or change in quality occurs, it is advantageous in reworkablity.

Optical conversion elements other than polarizing plates, such as retardation films or viewing angle correction films, may be attached to the fixing member 610 and the holding member 620.

Further, the fixing member 610 and the holding member 620 are fit together with the standing pieces 612 and 622 inside and the base portions 611 and 621 opposed. At this time, since the protrusions 627 are protruded through the slots 617 and the protrusions 627 are supported in the peripheries of the slots 617, the fixing member 610 and the holding member 620 can contribute to workability without being separated or dropped.

Further, the fixing member 610 and the holding member 620 are fit together and nested. Thermal capacity depending on the standing pieces 612 and 622 and bent pieces 623 inside the fixing member 610 and the holding member 620, while the light exit-side polarizer 630 is covered by the base portions 611 and 621 and the standing pieces 612 and 622 and the heat conductivity between the light exit-side polarizer 630 and the fixing member 610 and the holding member 620 becomes higher. Specifically, the fixing members 610 and the holding members 620 not only serve as mounting members for the liquid crystal panels 441R, 441G, and 441B, but also serve as heat releasing members for the light exit-side polarizers 630.

As described above, since the panel holding frames 820 are secured to the holding members 620 by screws, the fixing members 610 and the holding members 620 also serve as heat releasing members for the light modulators 440R, 440G, and 440B.

The optical device main body 48 is assembled as described below.

The upper base 446 and the lower base 447 are respectively fixed by adhesion on the cross dichroic prism 443 in advance, and the cross dichroic prism 443 is disposed on a predetermined optical axis of the optical component casing 47.

Further, the liquid crystal panels 441R, 441G, and 441B are accommodated in the panel holding frames 820 and the panel holding frames 820 are secured to the holding members 620 with screws FS.

Furthermore, the fixing members 610 are fixed by adhesion on the outer peripheral surfaces of the upper base 446 and the lower base 447 with a heat conducting silicone adhesive so as to be along the luminous flux incident end surfaces of the cross dichroic prism 443.

Then, the light modulators 440R, 440G, and 440B are positioned with high accuracy and the optical device main body 48 will be assembled.

The work required here is only to fit the holding members 620 oppositely with the fixing members 610, and, after the positioning is completed, these fixing members 610 and holding members 620 are fixed to each other.

Since the fixing members 610 have been already fixed along the luminous flux incident end surfaces of the cross dichroic prism 443, and the light modulators 440R, 440G, and 440B have been mounted to the holding members 620, the positioning of the light modulators 440R, 440G, and 440B is regulated only by the positional relationship between the fixing members 610 and the holding members 620.

In the related art, pins, wedges, or a variety of fixing plates have been required and a structure in which these are mounted in complex multiple layers has been adopted. However, since the light modulators 440R, 440G, and 440B are mounted basically only by two members as fixing members 610 and holding member 620, the number of parts is reduced and the manufacturing process is simplified by simplifying the structure. Thereby, the ease of assembly can be enhanced dramatically.

At the time of this assembly, a thermosetting adhesive, an ultraviolet light cure adhesive, or the like is used according to the material of members to be bonded. Thereby, the adhesive is rapidly cured and working efficiency can be enhanced. Specifically, a thermosetting adhesive can be used suitably for a material having high heat conductivity, such as metals, while a light cure adhesive, such as an ultraviolet light cure adhesive can be used suitably when a material having light transmissivity, such as a transparent synthetic resin is used and light can enter the bonded part.

First, the panel holding frame 820 of the light modulator 440G to be opposed to the projection lens 46 together with the holding member 620 is disposed oppositely to the fixing member 610 fixed to the luminous flux incident end surface of the cross dichroic prism 443. Chucking at this time can be performed according to the outer shape of the panel holding frame 820 or the holding member 620. Alternatively, the panel holding frame 820 may be sucked together with the holding member 620.

Then, the light modulator 440G is moved together with the holding member 620 and the holding member 620 is fit with the fixing member 610 so that each other's standing pieces 612 and 622 may overlap. At this time, the protrusions 627 are pressed into the slots 617 from the side and protrude through the slots 617. Thereby, the fixing member 610 is not dropped off the fixing member 610 and the movement of the protrusions 627 are regulated within ranges of the slots 617 and the subsequent positioning operation becomes easy.

In this condition, an ultraviolet light cure adhesive is injected from the injection holes 618 of the fixing member 610 into between the standing pieces 612 and standing pieces 622.

Subsequently, the holding member 620 is moved in the optical axis direction relative to the fixing member 610, and focus adjustment to adjust the focal surface of the liquid crystal panel 441 G within the back focus surface of the projection lens 46 is performed.

At this time, the light modulator 440G can be moved arbitrarily in a range in which the protrusions 627 can be moved within the slots 617.

After the positioning of the light modulator 440G is completed, the ultraviolet light cure adhesive injected between the standing pieces 612 and 622 is cured by applying ultraviolet light so as to fix the light modulator 440G.

At this time, since the light travels around from the injection holes 618, the ultraviolet light cure adhesive can be cured rapidly. Further, the adhesive hardly flows because it collects in the injection holes 618 and slots 617. Thereby, contamination of the light exit-side polarizer 630 can be reduced or prevented.

By the way, the ultraviolet light cure adhesive may be injected after the positioning of the light modulators 440R, 440G, and 440B is completed. However, since it is conceivable that the surface tension of the adhesive may move them out of positioning, the adhesive may be injected before positioning as described above.

Further, a thermosetting adhesive can be used to secure the fixing member 610 and the holding member 620. However, in view of protection of the light exit-side polarizer 630 from heat, a light cure adhesive, such as an ultraviolet light cure adhesive may be used.

After the light modulator 440G is thus fixed, similarly with the light modulators 440R and 440B, the fixing members 610 and the holding members 620 are fit together. The ultraviolet light cure adhesive is injected from the injection holes 618, and the above described focus adjustment is performed. Further, alignment adjustment is performed with the light modulator 440G as a reference so that the positions of the light modulators 440R, 440G, and 440B are harmonized with each other in order not to produce color displacement between the respective pixels.

Here, there are gaps between the fixing members 610 and the holding members 620, and the positions and attitudes of the light modulators 440R and 440B can be changed by slidingly moving the standing pieces 612 and the standing pieces 622.

Specifically, the light modulators 440R and 440B can be moved in any direction of the direction in which pairs of standing pieces 612 and 622 are opposed (set to the X direction), the Y direction in which the standing pieces 612 and 622 extend along the outer periphery of the base portions 611 and 621, the Z direction as the longitudinal diameter directions of the slots 617 (optical axis direction), and the respective rotation directions of the X and Y directions. Thereby, image quality of optical images can be made finer.

In the process of the focus and alignment adjustment, the space between the standing pieces 612 of the fixing members 610 and the standing pieces 622 of the holding members 620 is filled with the injected adhesive, and the adhesive is cured by applying ultraviolet light thereto.

The alignment adjustment may be performed in a condition in which the adhesive between the fixing member 610 and the outer periphery of the upper and lower bases 446 and 447 is uncured, while moving the fixing member 610 along the adhesion surface in the X and Y directions. However, the adjustment performed by slidingly moving the fixing member 610 and the holding member 620 as described above may facilitate the positioning operation significantly because it is necessary to move only the holding member 620 relative to the fixing member 610.

Thus, since the positioning of the light modulators 440R, 440G, and 440B is simply regulated by the positional relationships between the fixing members 610 and the holding members 620, there is hardly any factor that moves the light modulators out of positioning compared to the pins, wedges, and various fixing plates positioning the light modulators in the related art. Further, compared to the related art fixing plates or the like on which pins etc. are formed so as to protrude therefrom, the fixing members 610 and the holding members 620 have relatively simple and accurate shapes. Thereby, no difficulty is produced in positioning operation.

Therefore, the liquid crystal panels 441R, 441G, and 441B to be positioned at the back focus of the projection lens 46 can be positioned with high accuracy, and thereby, finer projection images can be realized.

Further, in the related art, the light modulators 440R, 440G, and 440B are partially supported by pins or the like and joining strength is weak. However, the fixing members 610 and the holding members 620 larger than the pins or the like are bonded to the upper base 446, lower base 447, and panel holding frames 820 with sufficient bonding areas. Thereby, the light modulators 440R, 440G, and 440B can be reliably supported to the cross dichroic prism 443.

Accordingly, even when an impact is applied, or the modulators are used for many years, the positions of the light modulators 440R, 440G, and 440B are hardly displaced and pixel displacement of optical images can be reduced or prevented.

In summary, the fixing members 610 fixed to the upper base 446 and the lower base 447 and the holding members 620 fixed to the panel holding frames 820 are secured. Thereby, the-light modulators 440R, 440G, and 440B are mounted to the cross dichroic prism 443 and fixed thereto.

Since the standing pieces 612 of the fixing members 610 and the standing pieces 622 of the holding members 620 are overlapped and secured, they do not take so much space in the surface outward directions of the luminous flux incident end surfaces of the cross dichroic prism 443 and the downsizing of the optical device 44 is not inhibited.

Into the above described optical device main body 48, luminous fluxes enter via the light incident-side polarizers 444, and the incident light is transmitted through the liquid crystal panels 441R, 441G, and 441B, further transmitted through the light exit-side polarizers 630, and enter the cross dichroic prism 443.

Here, since the standing pieces 612 and 622 of the fixing members 610 and the holding members 620 stand along the optical axis direction, light is blocked as little as possible by the standing pieces 612 and 622 during the time when luminous fluxes are output from the light modulators 440R, 440G, and 440B. The luminous fluxes are transmitted through the openings of the holding members 620 and the fixing members 610, and enter the luminous flux incident end surfaces of the cross dichroic prism 443. Thereby, the margin of the luminous flux incident end surfaces of the cross dichroic prism 443 can be minimized and the cost of parts can be reduced by the downsizing of the cross dichroic prism 443.

Further, because of the downsizing of the cross dichroic prism, the back focus of the projection lens 46 becomes shorter and a greater volume of light is taken into by the projection lens 46, and light projection images can be obtained.

The liquid crystal panels 441R, 441G, and 441B, light exit-side polarizers 630, and the cross dichroic prism 443 are respectively heated by the incident of light. In consideration of the heat, respectively, the heat generated in the liquid crystal panels 441R, 441G, and 441B is heat conducted promptly to the panel holding frames 820, the holding members 620, and the fixing members 610, and released into cooling air from the surfaces thereof or heat releasing fins 822.

The heat generated in the light exit-side polarizers 630 is immediately conducted to the holding members 620 and the fixing members 610 and rapidly released from the surfaces thereof.

Here, the heat from the liquid crystal panels 441R, 441G, and 441B and the light exit-side polarizers 630 is conducted to the fixing members 610 and the holding members 620, and this heat is further conducted to the upper base 446 and the lower base 447, conducted from the arm portions 448 to the optical component casing 47, and finally conducted to the exterior case 2 through the optical component casing 47. Accordingly, the fixing members 610, the holding members 620, the upper base 446, the lower base 447, the optical component casing 47, etc. serve as heat sinks and thermal capacity is largely secured, the contact area with the cooling air increases, and heat exchange with the cooling air becomes efficient. Thereby, the cooling efficiency can be enhanced significantly.

The heat generated in the cross dichroic prism 443 is also conducted to the upper base 446, the lower base, and the optical component casing 47 and released.

Thus, since the light modulators 440R, 440G, and 440B and the light exit-side polarizers 630 can be heat released and cooled sufficiently and effectively, durability of polarization films of the light exit-side polarizers 630 and the liquid crystal panels 441R, 441G, and 441B is enhanced and the life thereof is extended. Thereby, the image quality deterioration due to thermal deterioration or the like can be reduced or prevented and functional reliability can be enhanced. 1-4. Cooling Structure Below, air-cooled type cooling provided in the projector 1 will be described. As shown in FIG. 1, the projector 1 includes an optical device cooling system A to principally cool the optical device 44 (FIG. 2), a light source cooling system B to principally cool the light source 413, and a power supply cooling system C to principally cool the power supply 3.

The optical device cooling system A includes an air intake opening (not shown) formed on the lower surface of the exterior case 2, the axial-flow air intake fan 51 disposed above the air intake opening, and an opening portion 4B formed in the bottom surface of the optical component casing 47 above the axial-flow air intake fan 51.

Fresh cooling air from outside the projector 1 is taken by the axial-flow air intake fan 51 from the air intake opening of the exterior case 2 via the opening portion 4B into the optical component casing 47. At this time, though illustration thereof is omitted, a rectifying plate is provided on the lower surface of the optical component casing 47. Thereby, the cooling air outside the optical component casing 47 is rectified so as to flow from bottom to top.

As shown by an arrow in FIG. 1, the cooling air guided into the optical component casing 47 is rectified, and thus, flows from beneath the optical device 44 to above, passes through the front rear surface side of the liquid crystal panel 441G, flows above the optical device main body 48 while cooling the bases 446 and 447, the fixing members 610, the holding members 620, the light modulators 440R, 440G, and 440B, and further, the light incident-side polarizers 444, etc.

At this time, since the fixing members 610 and the holding members 620 have C-shaped sections, the cooling air is rectified inside the base portions 611 and 621, the standing pieces 612 and 622, and bent pieces 623, and the cooling air is blasted along the plate surfaces of the light exit-side polarizers 630 and supplied to the entire of the light exit-side polarizers 630. Thereby, no temperature variation occurs to the light exit-side polarizers 630 and cooling effect is further enhanced.

Since the C-shaped sections of the fixing members 610 and the holding members 620 face against the flow of the air, the loss in the amount of the blasted air is suppressed as little as possible, and the air can hardly escape to the outside of the fixing members 610 and the holding members 620.

Thus, since the light modulators 440R, 440G, and 440B and the light exit-side polarizers 630 are efficiently cooled by two systems of cooling by the introduction of the cooling air and the above described heat release cooling, even when the flow rate of the cooling air circulating within the projector 1 is not increased, the projector 1 in which the optical device 44 is incorporated is not inhibited to provide higher brightness, smaller size, and lower noise.

Further, in the optical device cooling system A, the circulating air also has a function of blowing off the dust attached to the surfaces or the like of the liquid crystal panels 441R, 441G, and 441B in addition to the function of cooling the optical device 44. Accordingly, the surfaces of the liquid crystal panels 441R, 441G, and 441B are constantly in a clean condition, and stable image quality can be secured.

The light source cooling system B includes sirocco fan 52, duct 52A, and exhaust opening 2B, as shown in FIG. 1. In this light source cooling system B, the cooling air having passed through the optical device cooling system A is suctioned by the sirocco fan 52 into the light source 413 so as to cool the light source lamp 411, and then, exits from the optical component casing 47, passes through the duct 52A, and exhausted from the exhaust opening 2B to the outside.

The power supply cooling system C includes the axial-flow air exhaust fan 53 provided near the power supply unit 3 and the exhaust opening 2C. In this power supply cooling system C, the air heated by the heat of the power unit 3 is suctioned by the axial-flow air exhaust fan 53 and exhausted from the exhaust opening 2C. At this time, the air within the entire projector 1 is simultaneously exhausted so that the heat may not stay inside the projector 1.

The invention is not limited to the above described exemplary embodiment, and includes modifications shown as below.

The shapes and materials of the fixing members and the holding members are not limited to those in the above described exemplary embodiment. The number, positions, shapes, etc. of the holes and protrusions formed in the fixing members and the holding members are not limited, either.

For example, other than the plate metal working as in the above described exemplary embodiment, the fixing members and the holding members can be molded in C shapes.

Further, the invention can be achieved as long as the light modulators are fixed to the light combining device via the fixing members and the holding members without being provided with bases and screws. In the case of providing a base, the lower part of the base may be fixed to the casing of the projector.

Furthermore, the air flow in the cooling device of the projector does not necessarily flow from bottom to top as in the above described exemplary embodiment, but may flow downwardly.

The fixation mode of the fixing members and the holding members is not limited to the bonding fixation with an adhesive as in the above described exemplary embodiment. For example, fixation with two-sided tapes is conceivable. Further, it is also conceivable the members are heated and melted at the slots 617 and the protrusions 627 for fixation in the above described exemplary embodiment.

In the above described exemplary embodiment, the panel holding frames 820 are secured to the holding members 620 with screws FS. However, holding frames (panel holding frames 820) of the light modulation devices may be fixed to the holding members with an adhesive or the like.

Furthermore, their fixing parts of the holding frames (panel holding frames 820) of the light modulation devices, fixing members, and the holding members are filled with a heat conductive silicone adhesive, heat conductive silicone grease, or the like, and thereby, heat conductivity can be enhanced.

Although some examples are illustrated in the respective above described exemplary embodiments, as a heat conductive material, there are Mg alloy, Al alloy, Mo—Cu alloy, Ti alloy, and Fe—Ni alloy, and resin materials containing carbon fillers, and these materials can be adopted to the fixing members, holding members, bases, holding frames (panel holding frames 820), etc.

As long as the fixing members and the holding members can be slidingly moved, the gap dimensions between the standing pieces of the fixing members and the standing pieces of the holding members are not limited. With little gap, the fixing members and the holding members may move relatively only in the optical axis direction, and only the focus position may be adjusted. With significant allowance between the fixing members and the holding members, the fixing members and the holding members can be fixed by filling an adhesive in the gaps.

Further, when, the holding frames (panel holding frames 820) and the fixing members are opposing fit together in place of the holding members and the positioning of the light modulation devices (liquid crystal panels 441R, 441G, and 441B) is performed by slidingly moving them, operation and effect equal to the invention are exerted.

As types of optical conversion elements, not limited to the polarizing plates, viewing angle correcting plates, retardation plates illustrated in the respective above described exemplary embodiments, various elements to convert optical characteristics can be adopted. The number of these optical conversion elements is not limited and plural optical conversion elements of different types from each other may be combined.

The fixation mode of these plural optical conversion elements is not limited. For example, grooves may be formed in the fixing members and the holding members and the optical conversion elements may be inserted into the grooves. Further, the optical conversion elements may be directly attached to the luminous flux incident end surfaces of the light combining device.

Various liquid crystal can be adopted to light modulation devices other than the TN (twisted nematic) liquid crystal as in the above described exemplary embodiment.

Further, other than the light modulation devices, such as the liquid crystal panels 441R, 441G, and 441B, light modulation devices of micro-mirror devices or the like can be adopted.

Furthermore, the light modulation devices may be used by being switched from the light transmissive type using transparent electrodes in the above described exemplary embodiment to the reflective type using reflection electrodes according to need.

Further, the optical device 44 in the above described exemplary embodiment is of so-called 3-LCD type including the liquid crystal panels 441R, 441G, and 441B. However, it may be an optical device of 2-LCD type including light modulation devices, such as two liquid crystal panels. As long as the light modulation devices are supported and held by the fixing members and the holding members, the positioning of the light modulation devices can be performed by slidingly moving the fixing members and the holding members. Thereby, a single-LCD optical device can enjoy the operation and effect same as in the exemplary embodiments of the invention.

The optical device of an exemplary embodiment of the invention can apply to a rear type projector to performing project from the side opposed to the observation direction of the screen other than the front type projector 1 to perform projection from the side in the observation direction of the screen as in the respective above described exemplary embodiments.

The optical device of an exemplary embodiment of the invention can be applied to a projector, and further, to other optical equipment.

What is claimed is:

1. An optical device, comprising:

plural light modulators to form optical images by modulating plural color lights with respect to each color light according to image information;

a light combining device having plural luminous flux incident end surfaces opposed to the respective light modulators to combine the optical images formed in the respective light modulators;

fixing members located opposite the luminous flux incident end surfaces of the light combining device between the plural light modulators and the light combining device, and the fixing members being fixed to the light combining device; and holding members provided to the fixing members to hold the light modulators, and the holding members being located between the plural light modulators and the light combining device, the fixing members being formed to have C-shaped sections, the fixing members including base portions opposed to the luminous flux incident end surfaces and formed of rectangular plates in which opening portions to transmit luminous fluxes are formed and, the fixing members further including pairs of standing pieces extending from outer peripheral edges of the base portions and extending along substantially an entire length of the outer peripheral edges toward the light modulators and the pairs of standing pieces being opposed to each other, the holding members being formed to have C-shaped sections, the holding members including base portions formed of rectangular plates in which opening portions to transmit luminous fluxes are formed and to which the light modulators are mounted, and the holding member further including pairs of standing pieces extending from outer peripheral edges of the base portions and extending along substantially an entire length of the outer peripheral edges toward the luminous flux incident end surfaces and the pairs of standing prices being opposed to each other, and the light modulator being a separable piece that is fixed to the pairs of standing pieces of the fixing members and the pairs of standing pieces of the holding members, the pairs of standing pieces of the fixing members and the pairs of standing pieces of the holding members being slidingly fit together.

2. The optical device according to claim 1, holes being formed in one of the fixing members and holding members and protrusions inserted into the holes being formed in the others.

3. The optical device according to claim 1, optical conversion elements located between the light modulators and the luminous flux incident end surfaces being provided, and the optical conversion elements being mounted to tip end portions of the standing pieces of the holding members.

4. A projector to form an optical image by modulating luminous fluxes output from a light source according to image information and enlarging and projecting the image, the projector comprising the optical device according to claim 1.

5. The projector according to claim 4, a cooling device to circulate air taken from outside the projector being adopted, and the fixing members and the holding members being oriented so that the C-shaped sections may be substantially perpendicular to the flow of the air.

6. The optical device according to claim 1, the standing pieces of the holding members extending from the outer peripheral edges of the base portions of the holding members along an entire length of the outer peripheral edges.

7. The optical device according to claim 1, the standing pieces of the fixing members extending from the outer peripheral edges of the bases portions of the fixing members along an entire length of the outer peripheral edges.

* * * * *